(12) United States Patent
White

(10) Patent No.: US 6,253,882 B1
(45) Date of Patent: Jul. 3, 2001

(54) MOTOR WITH SYMMETRIC BRAKING SYSTEM

(75) Inventor: Jeffrey Neil White, Hopkinsville, KY (US)

(73) Assignee: White Hydraulics, Inc., Hopkinsville, KY (US)

( * ) Notice: Subject to any disclaimer, the term of this patent is extended or adjusted under 35 U.S.C. 154(b) by 0 days.

(21) Appl. No.: 09/255,426

(22) Filed: Feb. 22, 1999

(51) Int. Cl.[7] ............................................... F16D 55/36
(52) U.S. Cl. ........................ 188/71.5; 192/86; 192/91 A
(58) Field of Search ................................. 188/71.5, 72.1, 188/170, 72.4; 192/85 AA, 91 A, 86, 52.4

(56) References Cited

U.S. PATENT DOCUMENTS

| | | | |
|---|---|---|---|
| 3,680,666 | * 8/1972 | Sommer | 188/170 |
| 3,946,837 | * 3/1976 | Houser | 188/170 |
| 4,090,597 | * 5/1978 | Folomin et al. | 192/85 AA |
| 4,358,000 | * 11/1982 | Cumming | 188/71.5 |
| 4,431,091 | * 2/1984 | Scibbe | 192/85 AA |
| 4,491,202 | * 1/1985 | Schmitt | 188/71.5 |
| 4,562,902 | * 1/1986 | Scibbe | 192/86 |
| 5,099,964 | * 3/1992 | Cunningham et al. | 188/71.5 |
| 5,333,705 | * 8/1994 | Lemaire et al. | 188/71.5 |

* cited by examiner

Primary Examiner—Robert J. Oberleitner
Assistant Examiner—Robert A. Siconolfi
(74) Attorney, Agent, or Firm—Lightbody & Lucas

(57) ABSTRACT

A hydraulic brake is interconnected to two ports of a hydraulic motor, the pressurization of either port will act on a unitary brake piston to deactivate a spring loaded brake.

53 Claims, 5 Drawing Sheets

MOTOR WITH SYMMETRIC BRAKING SYSTEM

BACKGROUND OF THE INVENTION

Hydraulic pressure devices are efficient at producing high torque from relatively compact devices. However, the ability of an unaided hydraulic motor alone to retain an associated shaft in a certain preset braking position is limited due primarily to volumetric fluid bypass. Therefore typically if hydraulic pressure devices are going to be utilized in applications necessitating braking forces on a shaft, a separate brake is utilized.

DESCRIPTION OF THE PRIOR ART

Hydraulic pressure devices with auxiliary brakes are well known in the art. Examples include U.S. Pat. No. 3,960,470, U.S. Pat. No. 3,536,230, U.S. Pat. No. 3,616,822, U.S. Pat. No. 4,981,423, U.S. Pat. No. 3,969,950 and ACT/US/83/01683.

These brakes, while serviceable, necessitate complicated housing parts, a separation of the brake from the hydraulic motor and/or auxiliary brake actuation lines. Each of these additional components adds to the complexity of the overall device, increasing the manufacturing, maintenance and other cost potentates to the brakes. In addition, frequently additional auxiliary components are necessary in order to provide for the desired braking function.

The present invention is designed to provide a simple hydraulic brake which is more adaptable than that of the prior art.

OBJECTS AND SUMMARY OF THE INVENTION

It is an object of the present invention to simplify the construction of hydraulic brakes.

It is another object of the present invention to increase the reliability of hydraulic brakes.

It is a further object of the present invention to strengthen hydraulic brakes.

It is still another object of the present invention to reduce the cost of hydraulic braking mechanisms and their controllers.

It is yet another object of the present invention to increase the adaptability of hydraulic motors.

Other objects and a more complete understanding of the invention may be had by referring to the drawings in which:

DETAILED DESCRIPTION OF THE INVENTION

This invention relates to an improved hydraulic brake. The invention will be described in its preferred embodiment of a hydraulic brake utilized with a hydraulic gerotor motor.

The brake includes a housing 10, a driveshaft 60, a braking mechanism 100, and, in the preferred embodiment disclosed, a power mechanism 200.

The housing 10 serves to physically support and locate the driveshaft 60 and the braking mechanism 100, as well as typically mounting the power mechanism 200 to its intended use such as a mower, a scissorlift, a winch or other application.

Figure 1:
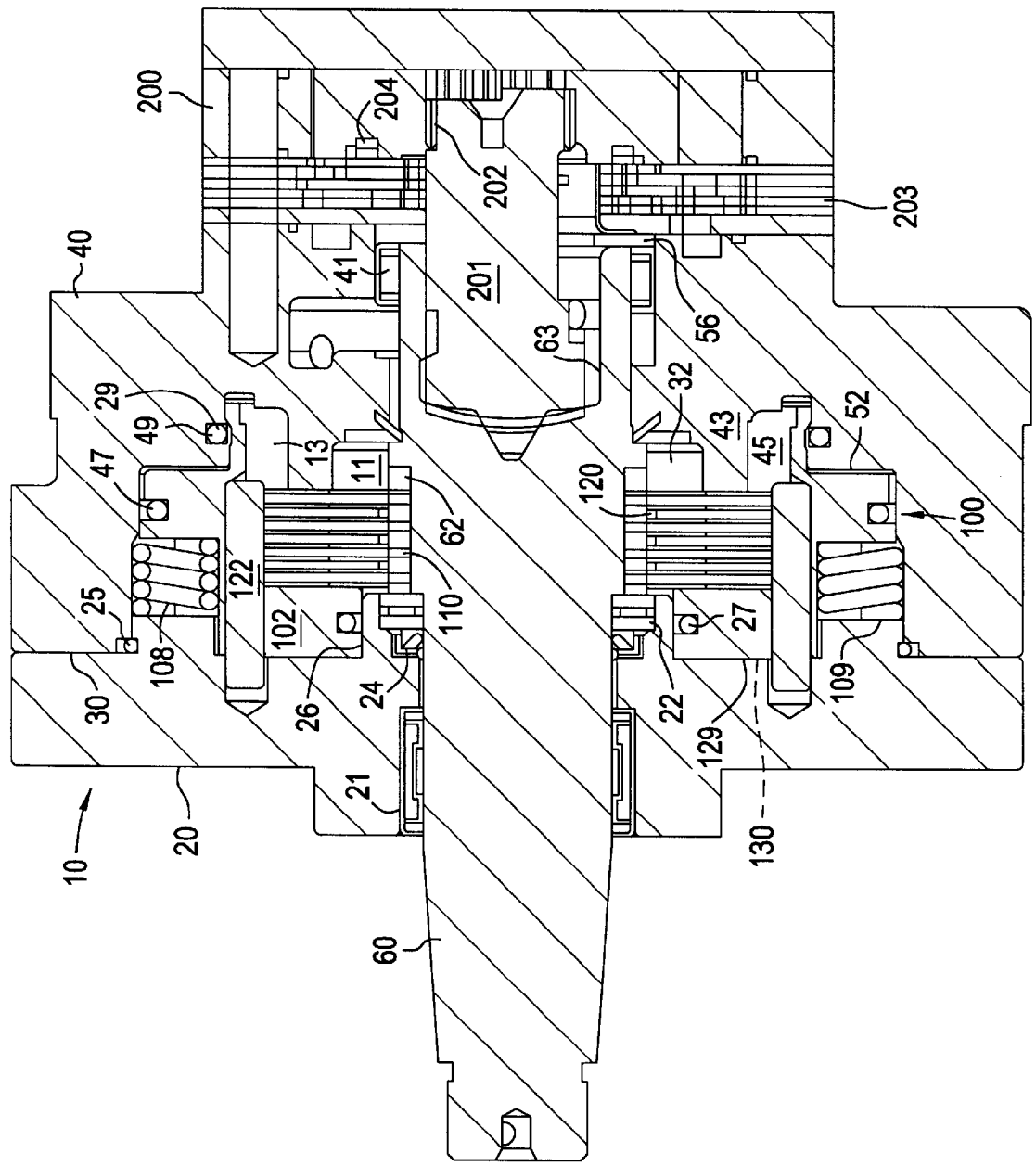
FIG. 1 is a longitudinal cross-sectional view of a spring applied pressure release hydraulic pressure device incorporating the invention of the application.
Figure 2:
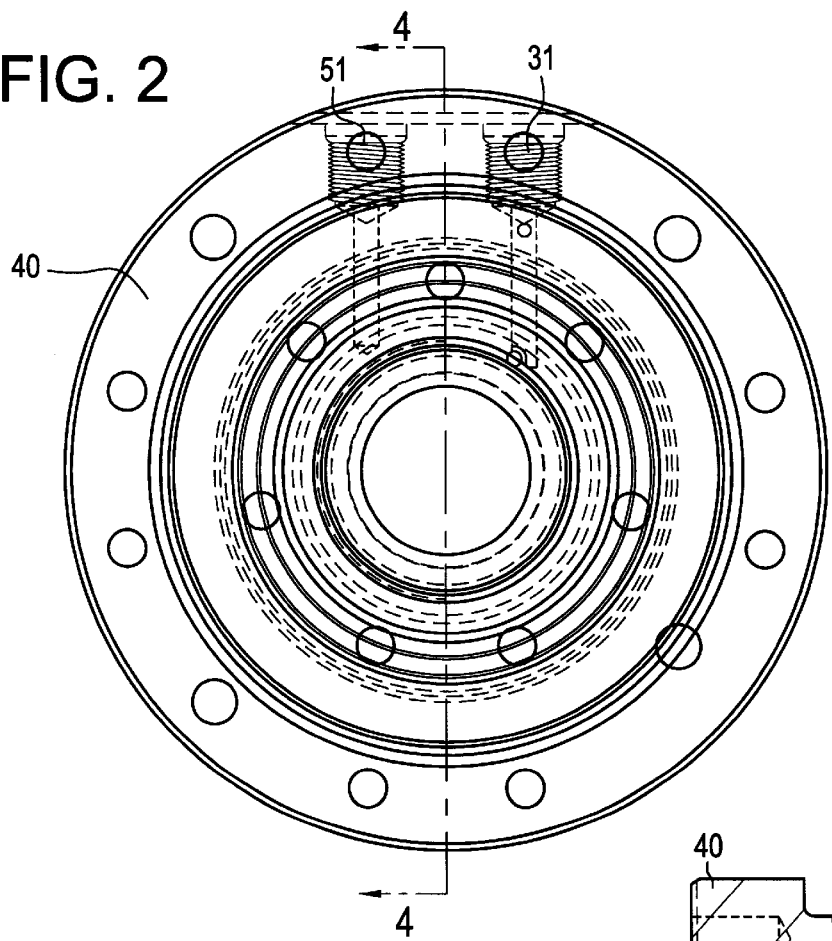
FIG. 2 is a lateral view of the back of the housing of FIG. 1.
Figure 3:
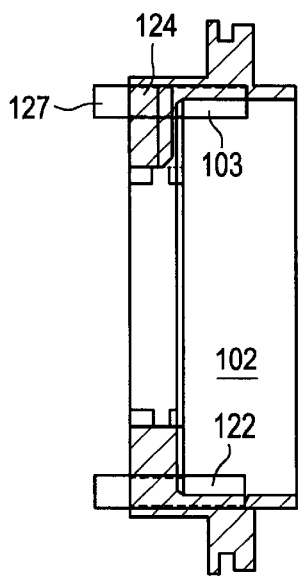
FIG. 3 is a cross sectional view of the activating piston of FIG. 1.
Figure 4:
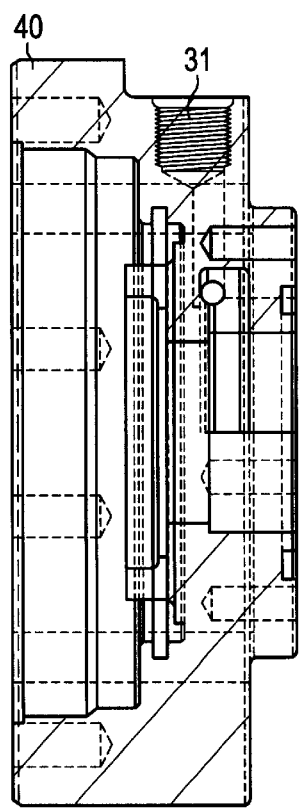
FIG. 4 is a cross sectional view of the back of the housing of FIG. 2.

The particular housing of FIG. 1 includes a central cavity 11 having two needle bearings 21, 41 rotatively supporting the driveshaft therein. A shaft seal 24 is incorporated between the cavity 11 and the driveshaft 60 in order to contain the operative fluid within the housing 10. Due to the fact that the cavity surrounding the shaft 40 in the housing 10 may be subjected to relatively high pressure fluid, a thrust bearing 22 is incorporated between the shaft 60 and the housing 10 to absorb any forces axially of the shaft 60.

The particular housing 10 disclosed is constructed of a front part 20 and a back part 40.

The front part 20 of the brake in the embodiment disclosed utilized to interconnect the housing 10 to the mechanism with which it will be utilized. This could be a frame, flange or other typically fixed member. The front part 20 of the housing 10 also serves as the reaction member for the later described brake mechanism 100.

The front 20 of the housing has substantially all its machined surfaces formed therein from one side thereof. This facilitates the alignment of the machined surfaces thereby reducing the cost of the brake assembly 100 as well as increasing service life. The major concentric surface which is machined in the front of the housing shown include the area surrounding the oil seal 24 and the surface 26 on one side of the activating piston for the brake mechanism 100. The additional lateral end 30 of the front 20 of the housing where it abuts the back 40 of the housing is also machined. The remainder of the surfaces of the front 20, except for the front bearing 21, have clearances to any adjoining part, thus removing the necessity of any machining thereof.

The oil seal 24 itself is located directly next to the main bearing 21 in a seal cavity formed in the front 20 of the housing 10.

On the other side of the main oil seal 24 a small protrusion 23, extending inwardly of the inner rest of the front of the housing, that locates the seal 24 axially in the housing while also aiding in retaining the shaft 60 in location in respect to the remainder of the brake assembly 100 via the thrust bearing 22 off of the end of a shoulder on the drive shaft 60.

The back part 40 of the housing 10 serves to contain most of the operative members of the brake mechanism 100. The particular back part 40 disclosed in addition contains both ports 31, 51 for the brake as well as serving as the location for interconnection of the later described power mechanism 200.

In respect to the back 40 of the housing, the major areas which are machined include the surfaces adjoining the cavity seals 47, 49 (later described), the surface of the main housing seal 25 and the rear bearing 41. A reduced area 45 in combination with aggregate clearances about such reduced area 45 eliminates the need to machine most of the inner-surface of the back 40 of the housing while also providing for an integral reservoir for the oil which is contained in the cavity 11 of the housing.

The driveshaft 60 is rotatively supported to the housing 10 by bearings 21, 41. This driveshaft serves to interconnect the later described power mechanism 200 at the other end of the shaft 60 to the outside of the device. This allows rotary power to be generated (if the device is used as a motor) or fluidic power to be produced (if the device is used as a pump). The particular driveshaft 60 includes an axially located hollow which has internal teeth 63 cut therein. This hollow provides room for the wobblestick of the later described power mechanism 200 while the internal teeth 63 drivingly interconnect the driveshaft 60 with such wobblestick 201. Additional teeth 202 at the other end of the wobblestick 201 drivingly interconnect the wobblestick to the rotor of the later described power mechanism, thus completing the power generating drive connection for the device.

The brake mechanism 100 can be utilized by itself or in combination with a power mechanism 200.

The preferred particular shaft 50 is interconnected to a brake mechanism 100 and a drive mechanism 200.

In the preferred embodiment disclosed, the drive mechanism 200 is a modification of the White Model RE Rotor Valved Motor, disclosed with a more complete explanation in White U.S. Pat. No. 4,697,997, the contents of which are incorporated by reference. Other example drive mechanisms include the Eaton Rotary Valve Motors (disclosed in U.S. Pat. No. 3,572,983), the TRW Orbiting Valve Motors (disclosed in U.S. Pat. No. 3,452,680) and Shaft Valved Gerotor Motors (disclosed by example in U.S. Pat. No. 4,285,643). Vane motors or piston motors could also be utilized. If no drive is provided, a plate (not shown) would be utilized to seal the opening in the back 56 of the housing, thus preventing internal contamination while also allowing for the selective pressurization of the later described deactivation cavity 32. The White Hydraulics' Closed Center Hydraulic Power Unit (such as that in White U.S. Pat. No. 4,877,383), an electric motor, or other power unit could also be utilized, the contents all of which are incorporated by reference. Note that in certain of these devices separate external piping may be appropriate between the brake ports 31, 51 and the associated devices. This would allow for a single brake unit to be utilized with many differing manufacturer's units with no extensive redesign of either. It would also allow filters, coolers, valves, and other ancillary parts to be easily incorporated as well as infield non-evasive repairs.

The brake mechanism 100 is the main braking device for the shaft 60. The particular brake mechanism 100 disclosed includes a spring activated piston 102, a spring 108, braking plates 110, and reaction plates 120.

The brake mechanism 100 preferably surrounds the shaft 60 located between the two bearings 21 and 41. This allows the bearings to primarily absorb any radial forces on the shaft 60.

Figure 9:
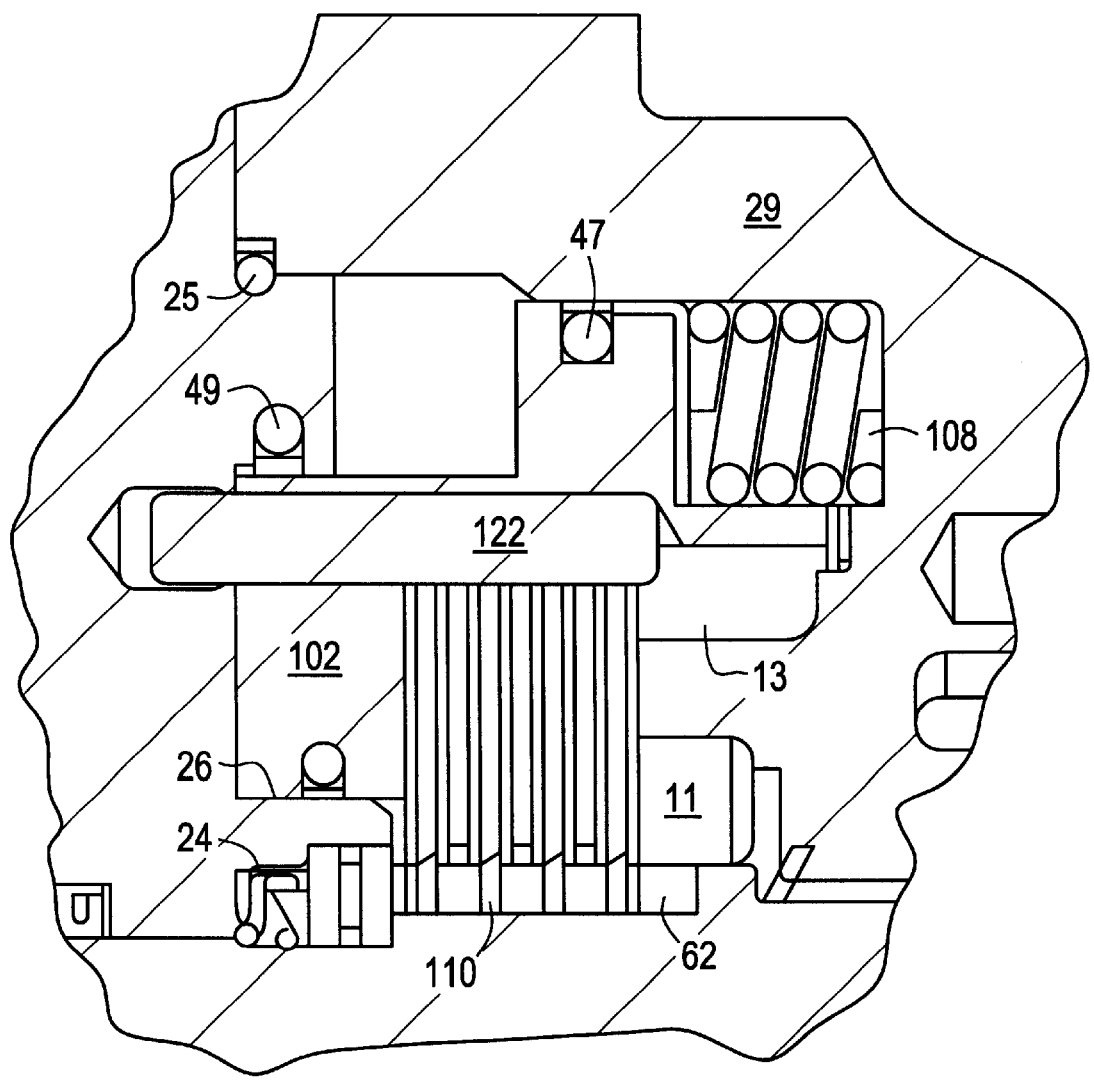
FIG. 9 is a partial view of a pressure applied spring release pressure device.

The brake assembly shown is spring activated and hydraulic pressure released (FIG. 1). If desired, alternate activation mechanism can be utilized such as pressure applied spring released brakes (FIG. 9), mechanical activation, and other systems.

The activating piston 102 is the main operation control for the brake mechanism 100. The activating piston 102 itself is located in a stepped recess 13 in the housing 10. The activating piston and stepped recess together define two fluidic cavities 32, 52 on a single side of the activating piston. Opposing these cavities 32, 52 is a set of actuation springs 108 located on the opposing side of the piston 102 between such piston and the front part 20 of the housing.

In the embodiment disclosed, a number of actuation springs 108 are located substantially equally spaced about the shaft 60 within a concentric activation cavity in the front 20 of the housing. The springs are retained radially and circumferentially located in position by small pockets 109 formed in the piston 102 of the brake mechanism 100. Alternately the activation springs 108 could be located by pins in either or both of the front 20 of the housing or the piston 102, or other means. The total force of the springs 108 are chosen sufficient to provide the main braking force for the brake mechanism.

The piston 102 is the major operating mechanism for the disclosed embodiment. Typically, the actuation springs 108 bias the piston 102 against the brake 110/reaction 120 disks stack to the opposite side 43 of the housing 10, thus to prevent the rotation of the shaft 60. However, upon selective interconnection of either the port 31, 51 to a source of high pressure, a deactivation cavity 32, 52 is pressurized, thus overcoming the force of the actuation springs 108 so as to release the brake. Two seals 27, 29 located between the piston 102 and the housing 10 (seal 27 to the front 20 and seal 29 to the back 40) retain the pressure in deactivation cavity 32 while two seals 47, 49 located between the piston 102 and the back 40 of the surrounding housing 10 retain the pressure in the deactivation cavity 52, thus allowing for the deactivation of the piston 102. Note in the embodiment disclosed the seals 29, 49 are coextensive. This reduces the cost and complexity of the device. Optionally, the seals could be separate with or without a second activating piston (i.e., one piston for each cavity).

In the preferred embodiment disclosed, the selective pressurization of the cavities 32, 52 between the housing 10 and the piston 102 are designed to selectively operate the brake and release same.

In the embodiment disclosed, the first cavity 32 is connected to one fluid port 31 while the second cavity 52 is interconnected to the other port 51. Due to this interconnect the selective pressurization of either or both ports 31, 51 will activate the piston 102 and thus release the brake.

In the preferred embodiment disclosed, the first cavity 32 is located radially displaced from the second cavity 52 substantially radially inward thereof. This provides for a shorter device than would be possible without this radial displacement and axial overlap. This orientation is therefore preferred.

The deactivation cavities have many unique properties.

For example, there are two cavities, either or both of which will release the braking mechanism. Further these cavities can accomplish this function connected with an allied device fluid connection (for example the two fluid ports of a gerotor pressure device as shown in the preferred embodiment), to one or the other, or even independently thereof. Further, both parallel or series connections could be utilized. This provides for a very flexible brake.

A further example, the pin 122 serves both to interconnect the reaction disks 120 to a surrounding member (the piston 102) while in addition preventing the rotation of the piston 102 (and thus the reaction disks 120) in respect to the housing 10. This further simplifies the construction of the brake.

Additional example since one cavity is located radially outward of another cavity, the braking mechanism is shorter than it otherwise would be. This also allows for multiple use of parts (i.e., the piston 102 and seal 49). This further simplifies the construction and operation of the brake. The location of the pins 122 overlapping both cavities further shorten the unit.

As previously set forth, the ports 31, 51 may or may not be coextensive with the pressure and return ports of an hydraulic drive mechanism. If coextensive (as shown), operation of the hydraulic drive mechanism in either direction would automatically release the brake. This coextensive connection could be provided externally or internally of the housing.

If the ports 31, 51 are not coextensive (or if no drive mechanism is provided) separate control of the brake is possible by one, the other, or both ports. This provides for a very flexible brake.

Further to above, the surface area of the cavities 32, 52 are designed to be substantially equal, irrespective of their radial displacement. This provides for a substantially equal movement of the piston 102 for a given pressure no matter which cavity 32, 52 happens to be pressurized. As the preferred embodiment disclosed is utilized in a device having substantially equal forward and/or reverse capabilities of the power mechanism 200, this substantial equalization is preferred.

Figure 5:
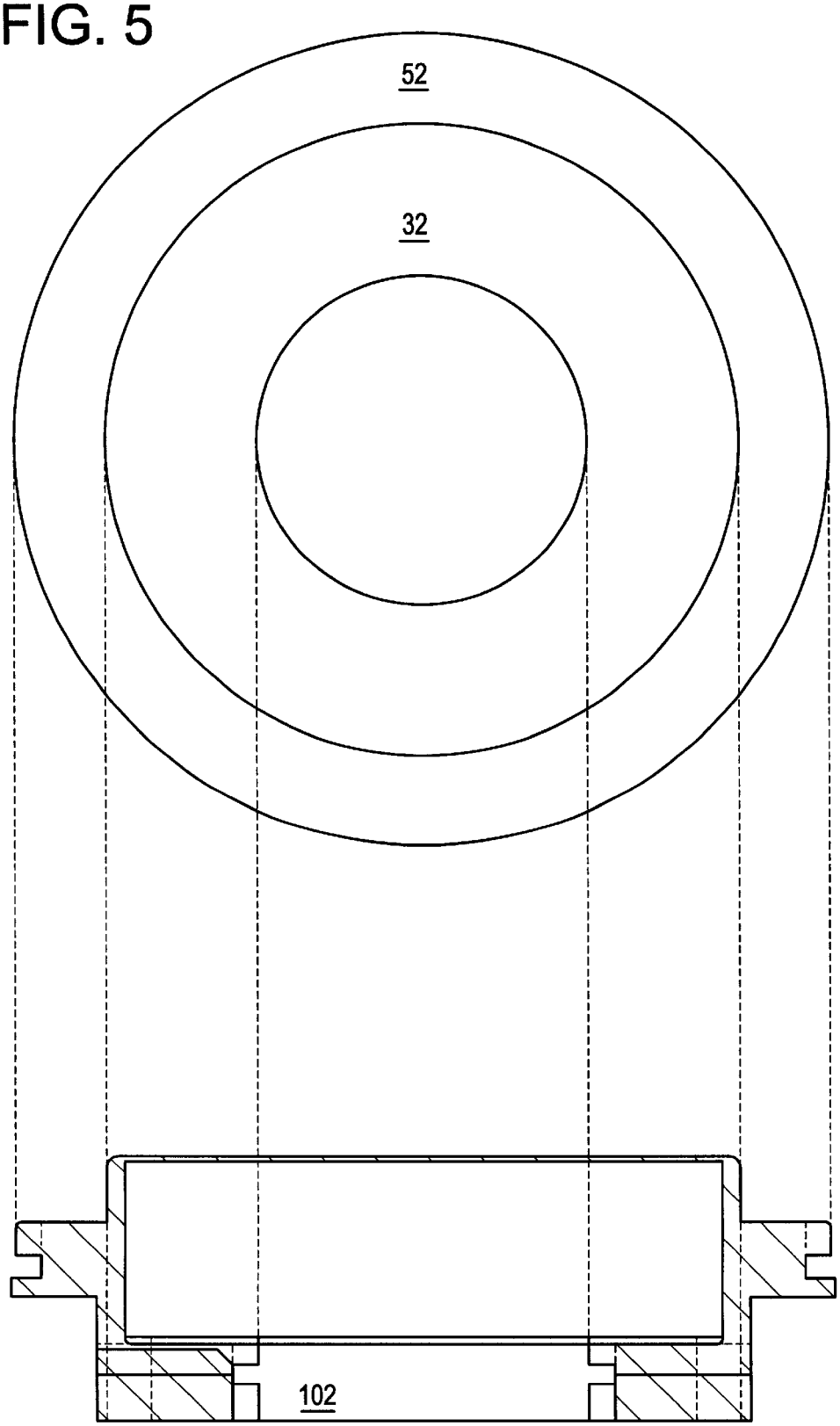
FIG. 5 is a comparative view of the surface areas of the two activation cavities of the piston of FIG. 3.
Figure 6:
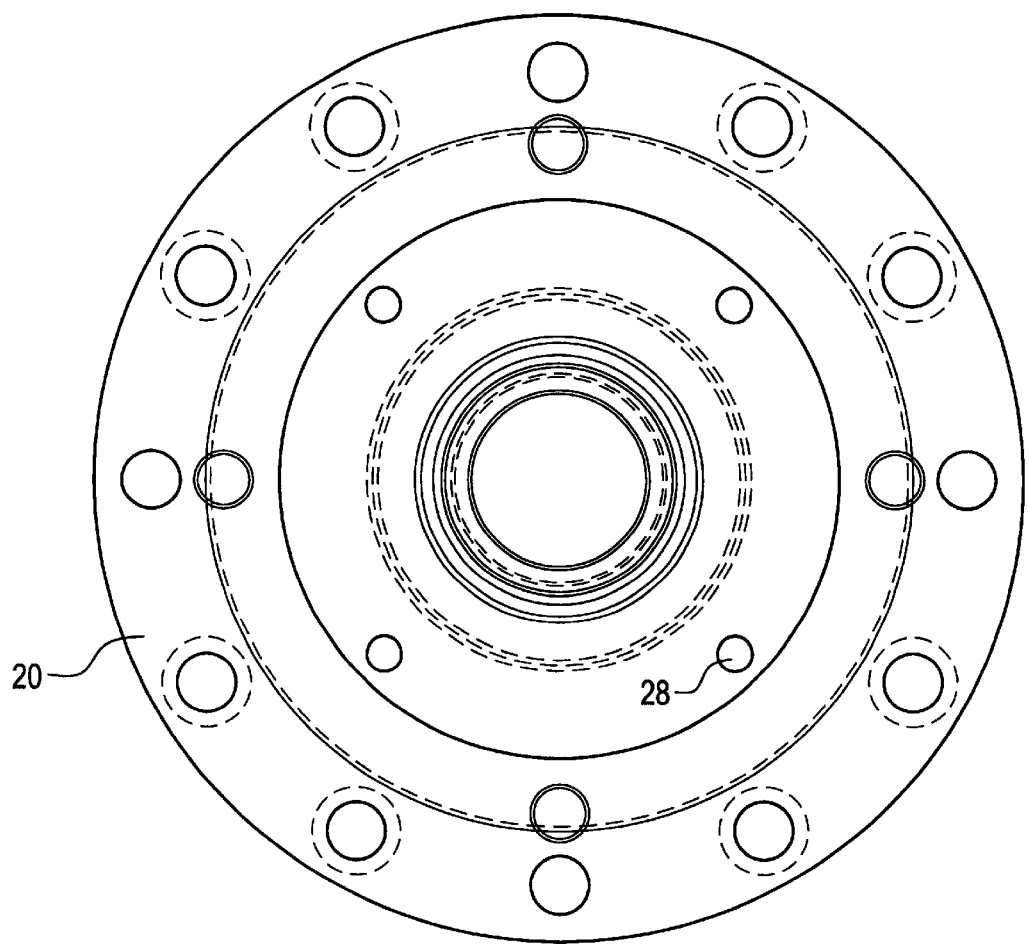
FIG. 6 is a lateral view of the front of the housing of FIG. 1.

For example in FIG. 5, the inside cavity 32 has an outer radius of some 2.31" and an inner radius of some 1.26", leaving a total surface area of some 11.78 square inches while the outside cavity 52 has an outer radius of some 3.0" and an inner radius of some 2.31" leaving a total surface area of some 11.5 square inches, an insignificant difference of less than 2%.

If differential action is desired, this can be easily accomplished by providing for the selected differential of surface area between the two cavities 32, 52. For example, if the manufacturer wanted a quick (or slow) release of the brake for pressurization of one port, the surface area for the cavity of such port would be increased (or decreased respectively). Some spring adjustment might also be appropriate. Additional example, if the manufacturer wanted the brake to release only if both ports were pressurized, each cavity would be sized insufficient to overcome the activation springs alone. The area 129 behind the piston 102 can also be used for brake control differential.

The particular brake mechanism 100 disclosed is spring actuated/pressure released.

To accomplish the actuation a series of springs 108 are located circumferentially about the activating piston 102 extending between such piston and the front part 20 of the housing 10. These springs 108 together serve to bias the activating piston 102 in brake activated position against the side 43 of the back of the housing 10. Thus the default position of the brake mechanism 100 is in a braking condition.

The particular braking plates 110 are a series of braking plates interconnected to the shaft 60 interleaved with a series of reaction plates 120 which are interconnected to the housing 10.

The braking disks 110 as shown have a series of projections or tabs 112 extending into the inner hole 113 of the disk 110. These tabs 112, preferably 3 to 15 in number, cooperate with a series of tabways 62 extending longitudinally inwardly in the outer circumference of the shaft 60. The cooperation between the tabs 112 and the tabways 62 solidly interconnect the braking disks 110 to the shaft for rotation therewith. This construction is simple while at the same time providing for an accurate interconnection between the braking disks 100 and the drive shaft 60, this in contrast with the more conventional triangular splines normally used for this interconnection. Further, the significant width of the tabs 112 efficiently pass the torque between the braking disks 110 and the shaft 60 on which the braking disks 110 are mounted.

In the particular preferred embodiment disclosed, the braking disks 110 are substantially 4" in diameter having a 1.9" inner hole 113 formed therein. There are six tabs 112 some 0.38" long and 0.15" thick leaving a spacing of 1.59" between opposing tabs. The disks themselves are 0.072" thick. There are six tabs 112 and four braking disks 110 utilized in the preferred embodiment disclosed. The spline has a pressure angle of substantially 30° (20° to 40° range) and an inner extension of 0.07". Both sides of the disks 110 include a 0.5" band of friction material such as sintered bronze.

The drive shaft 60 and the tabways 62 therein are sized to substantially match the dimensions of the inner hole 113 and the tabs 112 respectively with a 0.01" to 0.015" radial and circumferential clearance.

Figure 7:
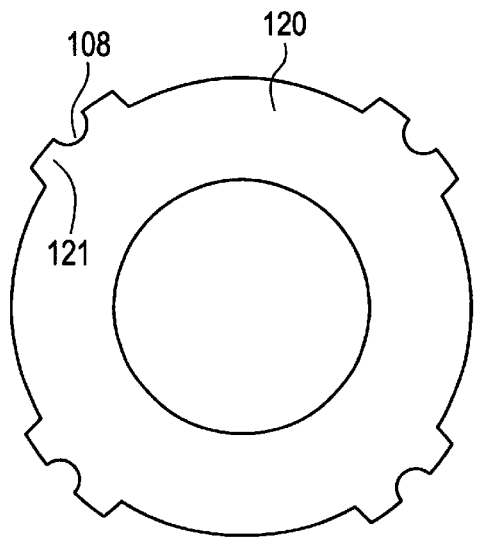
FIG. 7 is an end view of a reaction disk utilized with the brake of FIG. 1.
Figure 8:
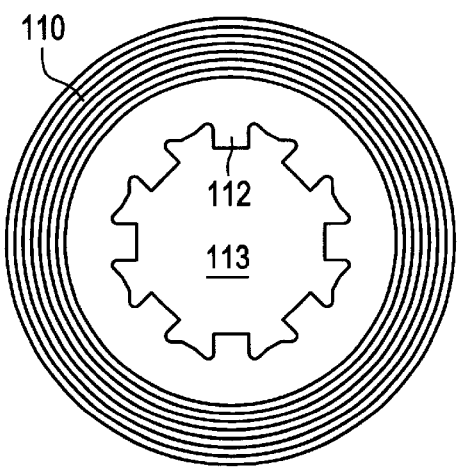
FIG. 8 is an end view of a brake disk utilized with the brake of FIG. 1.

Alternating with the braking disks 110 are a series of reaction disks 120 (FIG. 7). These reaction disks are interconnected with a fixed surrounding part in a non-rotative manner. The number of reaction disks is preferably substantially the same as the number of braking disks. Since any rotation of the reaction disks 120 in respect to the housing 10 would allow for some lash, it is preferred that the reaction disks 120 are supported solidly against rotation to a fixed surrounding part, typically directly or indirectly to the housing. In the preferred embodiment, this solid connection is provided by a series of a number of pins 122 pressed into holes in a part about the reaction disks 120. These pins 122 interconnect with corresponding grooves 108 cut into extended areas 121 about the outer diameter of the reaction disk 120. The number of pins and grooves can vary as necessary or desired. Three to eight are preferred; four are shown. This construction allows for the accurate location of the reaction disk 120 in respect to the adjoining part via four accurately drilled holes for the pins 122, thus for more precisely locating the reaction disk 120 while avoiding brake lash. Further, this is accomplished without the necessity of machining the adjoining part of the brake assembly 100 about the disks 120 thus keeping cost at a minimum.

In the particular preferred embodiment disclosed, the reaction disk 120 is substantially 4" in diameter having a 2.2" inner hole formed therein. There are four extended areas 121 some 0.17" long extending off of the outer circumference of the disk 125. Four 0.31" semi-circular grooves 123 are centered on the extended areas 121 at a 4.35" diameter bolt circle. The disks themselves are approximately 0.07" thick. They are coated with a reaction material such as iron phosphate on both sides.

The pins 122 are sized to substantially match the grooves 123. The opening in the adjoining part containing the disks has a diameter slightly greater than the 4.35" diameter of the disks.

The braking plates 110, being indexed to the shaft 60, rotate equally with the shaft 60. The reaction plates 120 remain in a stationary position due to the contact of the series of positioning pins 122 with the grooves 108 in the reaction plates 120.

In cooperation with the activating piston 102 (FIG. 1), the pins 122 serve both to affix the reaction disks 120 to the piston 102 and also serve to retain the activating piston 102 (and hence the reaction disks 120) in position in respect to the housing 10.

In respect to the former, a semi-circular groove 103 in the piston 102 captures the pins 122 against any circumferential movement, thus tying the reaction disks 120 to such piston. This interconnection is strengthened by the pins 122 axial extension 124 within the main body of the piston. This extension 124 further ties the pins 122 to the piston by holding the pins 122 in the groove 103 as well as resisting any angular shifting of the pins 122 in respect to the piston 102.

In respect to the latter, the small stub extension 127 of the pin 122 extending beyond the piston 102 cooperates with holes 28 in the front 20 of the housing 10 to locate the piston and prevent rotation of the piston 102 (and thus the reaction disks 120) in respect to the housing. For the former the pins 122, being captured in the holes 28 in the housing, do not allow rotary movement of the reaction disks 120 in respect to the housing. For the latter the holes 28 are slightly (0.01–0.05") larger in diameter than the pins 122. This allows some motion between the pins 122 and the housing 10 in line with the longitudinal axis of such pins 122. This allows for the unimpeded actuation/deactuation movement of the piston 102 along such axis.

In the embodiment shown, as the pins 122 are subjected to relatively high pressures (for example during the pressurization of the deactivation cavity 32) the pins 122 are sealed to the piston 102 at least somewhere in the extension 124. This prevents fluid flow by therebetween. In the example shown, this seal is provided by utilizing a press-type fit between the pin and piston (a 0.312" diameter pin is pressed into a 0.281" hole). A separate seal or other fluid retention means could also be utilized in addition/instead of this press fit type seal if desired and/or appropriate.

In cooperating with the piston 102, the pins 122 serve to affix the reaction disks 120 directly to the housing 10. The pins 122 otherwise function as previously described.

The particular pins 122 disclosed are some 1.625" in length and 0.313" in diameter. As previously set forth, these pins are pressed into four 0.281" diameter holes in the piston on a 4.35" diameter bolt circle. The free ends 127 of the pins extend some 0.3" beyond the face of the piston 102. The ends 127 of the pins themselves are located in four 0.35" diameter holes 28 in the front 20 of the housing, again on a 4.35" diameter bolt circle. The pins 122 thus cooperate with the housing to allow axial but not rotary movement of the piston 102 (and with it the reaction disks 120 to release the brake).

In this brake mechanism 100, the pressurization of either cavity 32, 52 will cause the activating piston 102 to move differentially in respect to the springs 108 and thus release the contact between the braking plates and reaction plates, thus deleting the braking function of the device.

In the preferred embodiment disclosed, the ports 31, 51 also serve to provide pressure and return to the power mechanism 200. Therefore, upon pressurization of a pertinent port 31, 51 to operate the power mechanism 200, the brake mechanism 100 will also be deactivated. This eliminates the needs for any braking valves, external fluidic connections, or other more complicated parts to provide for an integrated motor/brake operation (unless such connections, parts, etc. are desired). In this operation, since the cross-sectional area of the cavities 32, 52 (as shown) are substantially equal the braking release/actuation operations will be substantially identical no matter how the power mechanism 200 is operated. With differing cross sections, alternate actuation times and strengths can be provided.

In addition to the activating side of the piston 102 there is also an area 129 behind the piston 102 which is sealed off from the pressure/return fluid of ports 31, 51. This area 129 behind the piston thus provides for an additional control element over the brake mechanism 100—control which can be operated irrespective of the control provided by the rest of the brake mechanism 100.

The additional control includes plain operation, vented operation, charge compensation and/or a separate additional brake actuator.

In the plain operation of the area 129 behind the piston, this area would not be subject to any additional interconnections. Thus the control of the brake would be subject entirely to the pressurization of the cavities 32, 52. (Note that in certain instances, it may be advantageous to provide a bleed off path for this area 129 behind the piston so as to prevent any high pressure build-up due to incidental leakage past the seals for the cavities 32, 52. Such a bleed off could be provide by extending a small hole from the area 129 to the area around the driveshaft 60 inward of the bearing 21. This would allow any incidental high pressure fluid to pass through the bearing 21 and associated dust seal. As this bypass fluid would be minimal, the overall operation of the device would not be compromised by its addition.)

In the venting operation of this area 129 behind the piston, a dedicated venting mechanism would interconnect the area behind the piston in a controlled manner to an area of lower pressure. This venting could be provided through a dual action valve to the return port, or otherwise as desired. A separate line 130 is shown in representational form. Some sort of mechanism in this interconnection would allow for control of the degree of venting. This could provide, for example, a control of the speed of the braking mechanism 100 by impeding the passage of fluid through the vent.

Note, however, that in the preferred embodiment disclosed the overall movement of the piston 102 is sufficiently small that precise control would be difficult.

In the charged compensation mode, it is possible under certain circumstances that both ports 31, 51 would be actuated (i.e. both ports would be subjected to pressure above return pressure up to and including equal pressure on both ports). Under these circumstances, an additional port (again numbered 130) connected to the area 129 behind the piston can modify the operation of the brake mechanism 100 to other than the brake release action which could otherwise be provided by the pressurization of the two cavities 32, 52. This is especially true since the total area behind the piston 102 in the embodiment disclosed is substantially equal to the sum of the cross-sectional areas of the two activating cavities 32, 52.

The area 129 behind the piston can, in addition, be used as a separate brake actuator. In this embodiment, a port 130 would again be provided for interconnection via a separate valve to the source of high pressure. As the area 129 behind the piston is substantially equal to the first and second cavities combined area, upon full pressurization of all three ports 31, 51 and 130, the brake mechanism will remain in a braked condition—the pressure on both sides of the piston would cancel out allowing the spring 108 to continue to apply the brake. However, upon reduction of the pressure of the area 129 behind the piston, the brake would be released—the pressurization in the first and second cavities 32, 52 would be greater than the forces of the springs 108 in combination with the fluidic pressure in the area 129 behind the piston. For this reason, the brake can be activated via the port 130 totally separately of the pressure of the two ports 31, 51.

The pressure mechanism 200 is a device associated with the brake to provide for selective rotation of the shaft 60. The particular pressure mechanism disclosed operates according to the principles of U.S. Pat. No. 4,697,997 entitled Multiplate Manifold and U.S. Pat. No. 4,717,320 entitled Balancing Plate the contents of which are incorporated by reference.

In this power mechanism, one port 31 is interconnected to the area about the wobblestick 201 while the other port 51 is interconnected through a passage in the housing 20 and passages in the multiplate manifold to the valving groove 204 in the rotor of the device. With this internal connection upon pressurization of the port 31, the deactivation cavity 32 and the center opening of the rotor will be pressurized. This in turn will release the brake mechanism and allow the shaft to rotate in one direction. With this same setup, on pressurization of the other port 51, the deactivation cavity 52, and the outer valving groove 204 of the rotor would be pressurized. This would also release the brake mechanism and allow the shaft to rotate in the opposite direction.

Note in certain applications an automatic brake release might be desired in one but not both directions. Under this type of application, one fluid connection to a cavity would be interrupted by a valve. This would also allow for a feathered brake release.

Other pressure mechanisms and connections could be substituted if desired. For example, if the power mechanism 200 was a closed center motor, such as that shown in White U.S. Pat. No. 4,877,383 issued Oct. 31, 1989, there would be a series of four ports for fluidic interconnection (two for the brake mechanism 100 and two for the gerotor motor pressure mechanism 200). These ports could be connected in parallel (for simultaneous brake release/rotation as previously described). Two ports in parallel and two independent (this would allow brake release and rotation for the parallel port pressurization while allowing independent control for the outer ports), using the port 130 further increases the adaptability of the device from slowing brake release time to actively overriding the two other ports.

Although the invention has been described in its preferred embodiment with a certain degree of particularity, it is to be understood that numerous changes can be made without deviating from the invention as hereinafter claimed.

What is claimed:

1. A hydraulic brake for a power mechanism including two ports, the brake comprising a housing, a shaft, said shaft being rotatively connected to said housing, braking plates, said braking plates connected to said shaft for rotation therewith, reaction plates, said reaction plates being connected to said housing, said reaction plates adjoining said braking plates respectively, a cavity in said housing, an activation piston, said activating piston being in said cavity in said housing, means for said activating piston to cause physical braking contact between said braking plates and said reaction plates, spring means to bias said activating piston in one direction, seal means to define a cavity between part of said activating piston and said housing, means to connect said cavity to one port of said power mechanism so as to operate the brake in the opposite direction of said spring means on pressurization of one port of the power mechanism, a second seal means to define a second cavity between part of said activating piston and said housing, said second cavity being fluidically distinct from said cavity, and means to connect said second cavity to the other port of the pressure mechanism so as to operate the brake also in the opposite direction of said spring means on pressurization of the other port of the power mechanism.

2. The hydraulic brake of claim 1 characterized by said spring means including springs, and said springs extending between said housing and one of said brake disks or said reaction plates so as to bias the brake into a braking condition.

3. The hydraulic brake of claim 2 characterized in that said springs are on the opposite side of said activation from said cavity.

4. The hydraulic brake of claim 2 characterized in that said springs are on the opposite side of said activation from said second cavity.

5. The hydraulic brake of claim 1 characterized in that said activation piston is unitary in respect to both said cavity and said second cavity.

6. The hydraulic brake of claim 1 characterized by the addition of pins and said pins non-rotatively connecting said activating piston and said reaction plates to said housing.

7. A hydraulic brake for a power mechanism including two ports, the brake comprising a housing, a shaft, said shaft being rotatively connected to said housing, braking plates, said braking plates connected to said shaft for rotation therewith, reaction plates, said reaction plates being connected to said housing, said reaction plates adjoining said braking plates respectively, a cavity in said housing, an activation piston, said activating piston being in said cavity in said housing, spring means to move said activating piston in one direction to cause physical braking contact between said braking plates and said reaction plates, seal means to define a cavity between part of said activating piston and said housing, means to connect said cavity to both ports of said power mechanism so as to operate the brake in a direction opposite to said spring means on pressurization of either port of the power mechanism, a further cavity, seal means for said further cavity, said further cavity being on the opposite side of said activating piston of said cavity, and means to control the pressure in said further cavity to move said activating piston in the same direction as said spring means.

8. The hydraulic brake of claim 1 characterized in that said cavity is radially displaced of said second cavity.

9. The hydraulic brake of claim 1 characterized in that said cavity axially overlaps said second cavity.

10. The hydraulic brake of claim 1 characterized in that said cavity and said second cavity have substantially equal surface areas.

11. A hydraulic brake for a power mechanism including two ports, the brake comprising a housing, a shaft, said shaft being rotatively connected to said housing, braking plates, said braking plates connected to said shaft for rotation therewith, reaction plates, said reaction plates being connected to said housing, said reaction plates adjoining said braking plates respectively, a cavity in said housing, an activation piston, said activating piston being in said cavity in said housing, spring means to move said activating piston in one direction to cause physical braking contact between said braking plates and said reaction plates, seal means to define a cavity between part of said activating piston and said housing, means to connect said cavity to one port of said power mechanism so as to move said activating piston in the opposite direction as said spring means to operate the brake on pressurization of one port of the power mechanism, means to connect said cavity to the other port of said power mechanism so as to also move said activating piston in the opposite direction as said spring means to operate the brake on pressurization of one port of the power mechanism, and seal means to define a third cavity on the opposite side of said activating piston from said cavity and said second cavity and control means to control the pressure in said third cavity.

12. The hydraulic brake of claim 11 characterized in that said control means includes the selective pressurization of said third cavity.

13. A hydraulic brake for a power mechanism including two ports, the brake comprising a housing, a shaft, said shaft being rotatively connected to said housing, braking plates, said braking plates connected to said shaft for rotation therewith, reaction plates, said reaction plates being connected to said housing, said reaction plates adjoining said braking plates respectively, a cavity in said housing, an activation piston, said activating piston being in said cavity in said housing, means for said activating piston to cause physical braking contact between said braking plates and said reaction plates, seal means to define a cavity between part of said activating piston and said housing, means to connect said cavity to one port of said power mechanism so as to operate the brake on pressurization of one port of the power mechanism, a second seal means to define a second cavity between part of said activating piston and said housing, said second cavity being fluidically distinct from said cavity, means to connect said second cavity to the other port of the pressure mechanism so as to operate the brake on pressurization of the other port of the power mechanism, a seal means to define a third cavity on the opposite side of said activating piston from said cavity and said second cavity, said third cavity has a surface area substantially equal to the sum of the area of said cavity plus the area of said second cavity, and means to selectively pressurize said third cavity.

14. A hydraulic brake for a two ported device comprising a housing, a shaft, said shaft being rotatively connected to said housing, a power mechanism, means to connect said power mechanism to said shaft, said power mechanism connected to the two ports for selectively rotating said shaft on the pressurization of one port, braking plates, said braking plates connected to said shaft for rotation therewith, an activation piston, said activating piston being in said housing, spring means to move said activation piston in one direction in respect to the housing, pins, reaction-plates, said pins extending between said reaction plates and said activating piston and said housing to prevent the rotation of said reaction plates in respect to said housing, said reaction plates adjoining said braking plates respectively, means for said activating piston to cause physical braking contact between said braking plates and said reaction plates, seal means to define a cavity between part of said activating piston and said housing, means to connect said cavity to one port of said power mechanism to move said activation piston in a direction opposite to said spring means so as to operate the brake on pressurization of said one port of said power mechanism, second seal means to define a second cavity between part of said activating piston and said housing, said second cavity being fluidically distinct from said cavity, and means to connect said second cavity to the other port of said power mechanism to move said activation piston in a direction opposite to said spring means so as to operate the brake on pressurization of said other port of said power mechanism.

15. The hydraulic brake of claim 14 characterized by the addition of said spring means including springs, and said springs extending between said housing and one of said brake disks or said reaction plates so as to bias the brake into a braking condition.

16. The hydraulic brake of claim 15 characterized in that said springs are on the opposite side of said activation from said cavity.

17. The hydraulic brake of claim 14 characterized in that said activation piston is unitary in respect to both said cavity and said second cavity.

18. A hydraulic brake for a two ported device comprising a housing, a shaft, said shaft being rotatively connected to said housing, a power mechanism, means to connect said power mechanism to said shaft, said Power mechanism connected to the two ports for selectively rotating said shaft on the pressurization of one port, braking plates, said braking plates connected to said shaft for rotation therewith, an activation piston, said activating piston being in said housing, pins, reaction plates, said pins extending between said reaction plates and said activating piston and said housing to prevent the rotation of said reaction plates in respect to said housing, said reaction plates adjoining said braking plates respectively, means for said activating piston to cause physical braking contact between said braking plates and said reaction plates, seal means to define a cavity between part of said activating piston and said housing, means to connect said cavity to one port of said power mechanism so as to operate the brake on pressurization of said one port of said power mechanism, second seal means to define a second cavity between part of said activating piston and said housing, said second cavity being fluidically distinct from said cavity, means to connect said second cavity to the other port of said power mechanism so as to operate the brake on pressurization of said other port of said power mechanism, seal means to define a third cavity on the opposite side of said activating piston from said cavity and said second cavity, said third cavity has a surface area substantially equal to the sum of the area of said cavity plus the area of said second cavity, and means to selectively pressurize said third cavity.

19. A hydraulic brake for a reversible power mechanism having two ports, a housing, a shaft being rotatively connected to said housing, means to connect the power mechanism to said shaft, two ports, the two ports being in the housing, means within the housing to interconnect the two ports to the two inputs of said power mechanism respectively, the brake comprising:
braking plates, means to connect said braking plates to said shaft for rotation therewith, an actuation piston, said actuation piston being in said housing, said actuation piston and said housing defining first and second activation cavities, reaction disks, pins, said pins non-rotatively connecting said activation disks to said activation piston and non-rotatively connecting said activation piston to said housing, springs, said springs extending between said housing and said activating piston to brakingly engage said brake disks to said reaction disks, said first and second activation cavities being on the opposite side of said activation piston from said springs, and means in said housing to connect the first port to said first cavity and means in said housing to connect the second port to said second cavity such that pressurization of either port releases the brake and operates the power mechanism.

20. The hydraulic brake of claim 19 characterized by said activation piston and said housing defining a third cavity,
said third cavity being on the same side of said activating piston as said springs,
and selective means to pressurize said third cavity.

21. The hydraulic brake of claim 19 characterized in that said activation piston is unitary in respect to both said cavity and said second cavity.

22. The hydraulic brake of claim 19 characterized in that said cavity is radially displaced of said second cavity.

23. The hydraulic brake of claim 19 characterized in that said cavity axially overlaps said second cavity.

24. The hydraulic brake of claim 19 characterized in that said cavity and said second cavity have substantially equal surface areas.

25. The hydraulic brake of claim 24 characterized by seal means to define a third cavity on the opposite side of said activating piston from said cavity and said second cavity, and said third cavity has a surface area substantially equal to the sum of the area of said cavity plus the area of said second cavity.

26. In a hydraulic brake having two sealed braking cavities adjoining an activating piston, both of which have a surface area, the two braking cavities being fluidically distinct from each other, the improvement of one of the two braking cavities being located at least partially outward of the other braking cavity on the same side of the activating piston, the surface areas of the two braking cavities being substantially equal, and spring means to move the activating piston, said spring means being located on the opposite side of the activating piston from the two braking cavities.

27. In a hydraulic brake having two sealed braking cavities, both of which have a surface area, the two sealed braking cavities being fluidically distinct from each other, the improvement of one of the two braking cavities being located at least partially outward of the other braking cavity on the same side of an activation piston, and the surface areas of the-two braking cavities have different surface areas with a selected differential so as to provide for a differential braking action, and spring means to bias said activation piston against the operation of the two braking cavities.

28. The hydraulic brake of claim 26 characterized in that the inner and outer diameters of the two braking cavities are unequal.

29. The hydraulic brake of claim 26 characterized in that one braking cavity does not radially overlap the outer braking cavity.

30. In a hydraulic brake having two sealed braking cavities in an activating piston and a brake application spring, the two sealed braking cavities each connected to its own individual ports, the improvement of both braking cavities being on the opposite side of the activating piston from the brake application spring.

31. The hydraulic brake of claim 30 characterized in that at least one braking cavity axially overlaps the brake application spring.

32. The hydraulic brake of claim 30 characterized in that at least one braking cavity radially overlaps the application spring.

33. In a hydraulic brake having a selectively operated braking piston working against a brake application spring to release the brake, the piston releasing the brake upon the selective pressurization of a piston cavity, the improvement of means to pressurize the piston cavity on pressurization of either of two ports to move the piston against the brake application spring, a further cavity, further means for said further cavity to apply force on the same braking piston in the same direction as said brake application spring, and means to selectively operate said further means to modify the braking force.

34. The hydraulic brake of claim 1 characterized by the addition of said spring means including springs, and said springs being connected between the housing and said activating piston to bias the piston into a released condition.

35. The hydraulic brake of claim 1 characterized by the addition of said spring means including springs, and said springs being connected between the housing and said activating piston to bias the piston into a braking condition.

36. The hydraulic brake of claim 1 characterized in that one of the two cavities is located at least partially outward of the other cavity.

37. The hydraulic brake of claim 36 characterized in that the surface areas of the two cavities are substantially equal.

38. The hydraulic brake of claim 36 characterized in that the surface areas of the two cavities have a selected differential surface area so as to provide a differential braking action.

39. The hydraulic brake of claim 26 characterized by the seals for the two braking cavities including a common component between the two braking cavities.

40. The hydraulic brake of claim 26 wherein said activating piston being located between the housing and the brake to selectively operate same, and the housing and the activating piston defining the two braking cavities.

41. The hydraulic brake of claim 40 characterized by said spring means including springs, and said springs being connected between the housing and said activating piston to bias the piston into a released condition.

42. The hydraulic brake of claim 40 characterized by said spring means including springs, and said springs being connected between the housing and said activating piston to bias the piston into a braking condition.

43. The hydraulic brake of claim 40 characterized by the seals for the two braking cavities including a common component between the two braking cavities.

44. The hydraulic brake of claim 30 characterized in that one braking cavity does not at least partially radially overlap the other braking cavity.

45. The hydraulic brake of claim 44 characterized by the seals for the two braking cavities including a common component between the two braking cavities.

46. The hydraulic brake of claim 30 characterized in that the braking cavities have surface areas respectively and the surface areas of the braking cavities being substantially equal.

47. The hydraulic brake of claim 30 characterized by the device having two selectively pressurized ports and one port being connected to one cavity respectively.

48. The hydraulic brake of claim 30 characterized by the addition of a power mechanism, said power mechanism having two operating ports and said two operating ports being connected to said two selectively pressurized ports respectively.

49. The hydraulic brake of claim 30 characterized by the seals for the two braking cavities including a common component between the two braking cavities.

50. The hydraulic brake of claim 30 wherein the device has an activating piston, said activating piston being located between the housing and the brake to selectively operate same, and the housing and the activating piston defining the two braking cavities.

51. The hydraulic brake of claim 49 characterized by the addition of springs, and said springs being connected between the housing and said activating piston to bias the piston into a released condition.

52. The hydraulic brake of claim 49 characterized by the addition of springs, and said springs being connected between the housing and said activating piston to bias the piston into a braking condition.

53. The hydraulic brake of claim 49 characterized by the seals for the two braking cavities including a common component between the two braking cavities.

* * * * *